(12) United States Patent
Koscielecka et al.

(10) Patent No.: US 8,979,108 B2
(45) Date of Patent: Mar. 17, 2015

(54) LEVER-PROPELLED BICYCLE

(76) Inventors: Anna Koscielecka, Stamford, CT (US);
Boguslaw Koscielecki, Torun (PL);
Marika Koscielecka, Torun (PL)

(*) Notice: Subject to any disclaimer, the term of this patent is extended or adjusted under 35 U.S.C. 154(b) by 0 days.

(21) Appl. No.: 13/982,368

(22) PCT Filed: Jan. 30, 2012

(86) PCT No.: PCT/PL2012/000005
§ 371 (c)(1),
(2), (4) Date: Jul. 29, 2013

(87) PCT Pub. No.: WO2012/105859
PCT Pub. Date: Aug. 9, 2012

(65) Prior Publication Data
US 2013/0307245 A1    Nov. 21, 2013

(30) Foreign Application Priority Data

Jan. 31, 2011  (PL) .......................................... 393795

(51) Int. Cl.
*B62M 1/00* (2010.01)
*B62M 1/28* (2013.01)
*B62M 1/24* (2013.01)

(52) U.S. Cl.
CPC .. *B62M 1/28* (2013.01); *B62M 1/24* (2013.01)
USPC .......................................... 280/258; 280/253

(58) Field of Classification Search
CPC ............. B62M 1/24; B62M 1/26; B62M 1/28
USPC ................................ 280/258, 253
See application file for complete search history.

(56) References Cited

U.S. PATENT DOCUMENTS

| 4,666,173 A * | 5/1987 | Graham .................... 280/255 |
| 5,335,927 A * | 8/1994 | Islas ........................ 280/255 |
| 8,215,654 B1 * | 7/2012 | Leser ....................... 280/252 |
| 2003/0042059 A1 * | 3/2003 | Tsai ......................... 180/181 |

(Continued)

FOREIGN PATENT DOCUMENTS

| DE | 834197 | 3/1952 |
| DE | 3904571 | 8/1990 |

(Continued)

*Primary Examiner* — Joseph Rocca
*Assistant Examiner* — Marlon Arce
(74) *Attorney, Agent, or Firm* — Gordon & Jacobson, PC

(57) ABSTRACT

A bicycle equipped with two, oscillatingly mounted on a joint axis (1), rear-facing levers (2) with pedals (3) and a rotary-return mechanism comprising a hub (9), bearing-placed on an axis (8), on which fixed are two freewheels (6) cooperating with levers (2) and a third chainwheel (10) transmitting the drive through the chain (13) and sprocket (14) onto the bicycle's drive wheel (15). To each of the levers (2) attached is rotatively on an axis (5) one end of one of the two chains (7) which connect these levers (2) with one of the two freewheels (6), and the other ends of these chains (7) are mutually joined with a chain (11) run on a reversible chainwheel (12). The lever (2) together with a part of the chain (7) in the upper extreme position of the pedal (3) is tangent to one of the two freewheels (6), and the second lever (2) in the bottom extreme position of the second pedal (3) is in a near-vertical position. The chain (11) and reversible chainwheel (12) ideally are lying in a vertical plane tangent to freewheels (6). The rotary-return mechanism is equipped with guards (16) protecting chains (7) against falling off the freewheels (6). In a similar way, the guard (17) protects the chain (11) against falling off the reversible wheelchain (12). The bicycle according to the invention can be equipped with both an internal and external speed changer, and it can be produced in a horizontal version.

16 Claims, 1 Drawing Sheet

(56) References Cited

U.S. PATENT DOCUMENTS

2003/0193159 A1* 10/2003 Ridenhour .................... 280/255
2008/0096708 A1 4/2008 Meguerditchian
2008/0106061 A1* 5/2008 Meguerditchian ............ 280/253
2010/0320716 A1* 12/2010 Sung ............................. 280/210
2010/0320718 A1* 12/2010 Buchberger ................. 280/221

FOREIGN PATENT DOCUMENTS

| FR | 351858 | 7/1905 |
| JP | 8113180 | 5/1996 |
| PL | 174172 | 6/1998 |
| WO | WO9731815 | 9/1997 |

* cited by examiner

LEVER-PROPELLED BICYCLE

CROSS-REFERENCE TO RELATED APPLICATIONS

This application claims priority from PCT/PL2012/000005 filed on Jan. 30, 2012 and from PL P.393795, filed Jan. 31, 2011, which are hereby incorporated by reference in their entireties.

TECHNICAL FIELD

The subject of the invention is a bicycle equipped with a lever mechanism and a rotary-return mechanism propelled by the power of muscles.

BACKGROUND ART

Known, from the Polish patent description No. 174172, is a propulsion mechanism, especially for a bicycle, equipped with two, oscillatingly mounted on a joint axis, rear-facing arms ended with pedals, and where on the hub of the bicycle's drive wheel mounted are two freewheels and to each of the arms fitted is rotatively one end of one of the two chains connecting this arm with one of two freewheels fitted on the hub of the bicycle drive wheel, and the other ends of chains are mutually joined with a flexible connector run on a reversible wheel.

SUMMARY OF THE INVENTION

The bicycle according to the invention has two rear-facing levers with pedals wherein the levers are configured to pivot about a joint axis in an oscillating manner, and a rotary-return mechanism comprising a hub, bearing-placed on an axis, and held up on a bracket fixed to the frame. On the hub are fixed two freewheels cooperating with the levers and a third chainwheel transmitting the drive through a chain onto the sprocket of the bicycle's drive wheel. To each of the levers is rotatively attached on a further axis one end of one of the two chains that connect the two levers with the two freewheels. The other ends of these chains are mutually joined with a chain that is guided by a reversible chainwheel. In an upper extreme position of one of the pedals, a straight line guided from the rotational axis of the associated lever through the axis of the attachment point (fixing) of the corresponding chain to the lever and along the part of the corresponding chain connected to the lever, is tangent to one of the two freewheels. In a bottom extreme position of the respective pedal, a straight line guided from the rotational axis of the associated lever through the axis of the attachment point of the corresponding chain adopts a vertical orientation. The angle between the straight lines is an obtuse angle.

The result of such an arrangement of applied technical means is a bicycle's propulsion mechanism with very favorable characteristics of the driving torque. This simple and ergonomic construction of the bicycle assures efficient operation while riding, and it makes it possible to use an internal or external speed changer. The vertical positioning of the lever in the bottom extreme position of its pedal makes it easier to get on and off the bicycle.

BRIEF DESCRIPTION OF THE DRAWINGS

The subject of the invention is presented in the example of realization on a drawing which shows a bicycle, equipped with a standard seat or a seat with a back support, with straight levers and with an obtuse angle between the levers.

DESCRIPTION OF EMBODIMENTS

Figure 1:
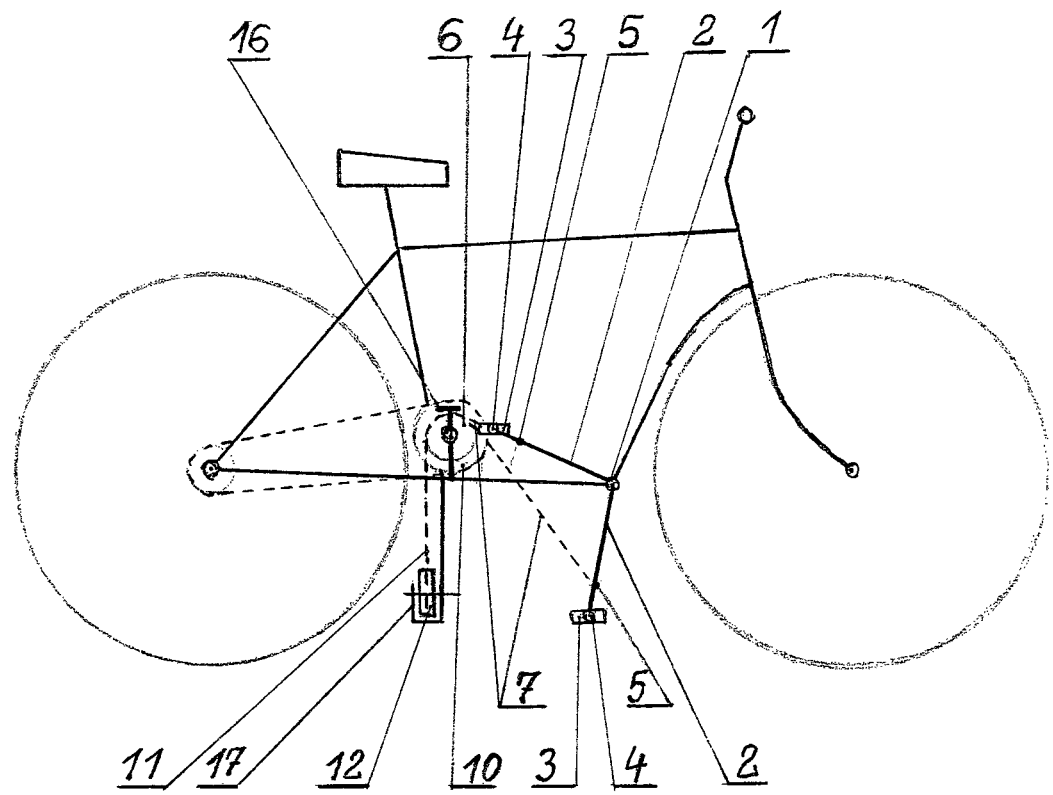
FIG. 1 presents a bicycle in a side view.
Figure 2:
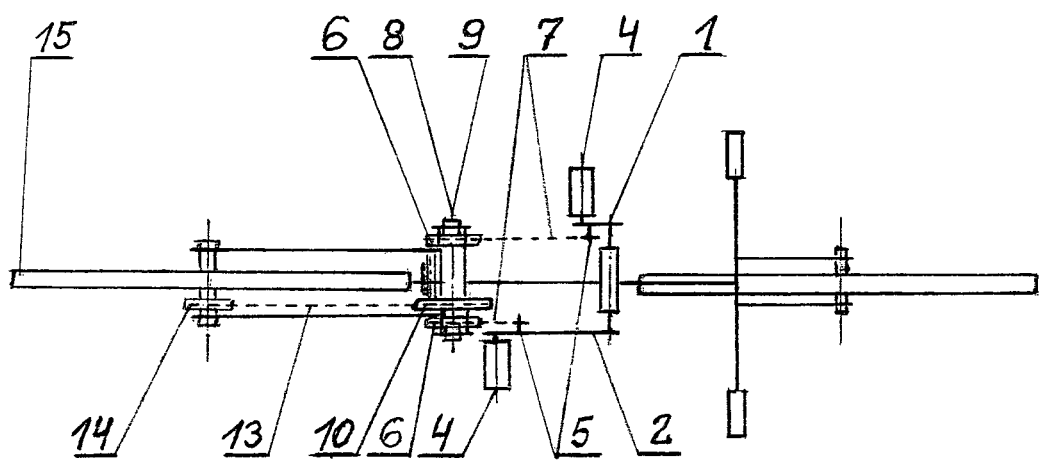
FIG. 2 presents the same bicycle in a top view.

The bicycle has two rear-facing levers (2) with pedals (3), wherein the levers (2) are configured to pivot about a joint axis (1) in an oscillating manner. On an axis (8), bearing-placed is a hub (9) mounted to the bicycle frame, on which are fixed two freewheels (6) cooperating with levers (2) and a third chainwheel (10) transmitting the drive through the chain (13) onto the sprocket (14) of the bicycle's drive wheel (15). To each of the levers (2) is rotatively attached at a further axis (5) one end of one of the two chains (7) to thereby connect the levers (2) to the two freewheels (6). The two chains (7) wrap around the appropriate freewheels (6) and are mutually connected to a chain (11) that is guided by a reversible chainwheel (12). In the upper extreme position of one of the pedals (3), an appropriate lever (2) together with a part of the chain (7) is tangent to one of the two freewheels (6) of the rotary-return mechanism. The second lever (2) in the bottom extreme position of the second pedal (3) is in a near-vertical orientation. Guards (16) protect chains (7) against falling off the freewheels (6), and the guard (17) protects the chain (11) against falling off the reversible chainwheel (12).

The propulsion of the bicycle's drive wheel is achieved by oscillating and interchangeable movements of the levers with pedals, where a driving stroke of one pedal causes a return idle stroke of the second pedal thanks to connecting the ends of the chains (7) with the chain (11) guided by the reversible chainwheel.

The mechanism converts the oscillating movement of levers with pedals into a rotary-return movement of the free wheels, and then into a rotary motion of the chainwheel transferring the propulsion through the chain and sprocket onto the bicycle's drive wheel. The levers may perform oscillating movements within the range of any angles from zero to obtuse angles.

The invention claimed is:
1. A bicycle comprising:
a rear wheel with a sprocket, wherein the rear wheel rotates about a first axis;
a first chain that interfaces to the sprocket of the rear wheel;
two rear-facing levers with pedals, wherein the two levers are pivotably mounted on a second axis spaced forward with respect to the first axis;
a reversible chainwheel that guides a second chain; and
a hub, disposed on a third axis spaced forward with respect to the first axis and spaced rearward with respect to the second axis, to which are fixed two freewheels cooperating with the two levers and a chainwheel, wherein the first and second freewheels and the chainwheel of the hub are configured to drive the first chain that interfaces to the sprocket of the rear wheel, wherein each of the two levers is operably coupled to a respective segment of the second chain that connects the respective lever to the corresponding freewheel;
wherein each of the two rear-facing levers is operably coupled to a respective segment of the second chain at a corresponding attachment point that defines an attachment axis;
wherein the rear-facing levers are each configured to pivot in an oscillatory manner between an upper extreme pedal position and a lower extreme pedal position; and wherein, in the upper extreme pedal position, a straight line guided from the second axis through the attachment axis defined by the attachment point of the respective lever to the corresponding segment of the second chain is tangent to the corresponding freewheel that rotates about the third axis.

2. A bicycle according to claim 1, wherein:
in the lower extreme pedal position, a straight line guided from the second axis through the axis of the respective pedal assumes a vertical orientation.

3. A bicycle according to claim 1, wherein:
the second chain and the reversible chainwheel lie in a plane tangent to the two freewheels.

4. A bicycle according to claim 1, wherein:
in the upper extreme pedal position, the attachment axis defined by the attachment point of the respective lever to the corresponding segment of the second chain is located on the straight line that is tangent to the corresponding freewheel and the attachment axis defined by the attachment point of the respective lever to the corresponding segment of the second chain is disposed between the second axis and an axis of the corresponding pedal.

5. A bicycle comprising:
a frame;
a rear wheel supported by the frame and configured to rotate about a first axis;
first and second rear-facing lever arms supported by the frame and configured to pivot about a second axis spaced forward with respect to the first axis of the rear wheel;
pedals extending from the first and second lever arms;
an intermediate hub supported by the frame in a position along a third axis, wherein the third axis is spaced forward with respect to the first axis of the rear wheel and spaced rearward with respect to the second axis of the lever arms;
a first freewheel, a second freewheel and a chainwheel all fixed to the intermediate hub and configured to rotate about the third axis;
a sprocket mounted on the rear wheel of the bicycle;
a first chain segment that links the first lever arm to the first freewheel;
a second chain segment that links the second lever arm to the second freewheel; and
a chain, separate from the first and second chain segments, that interfaces to both the sprocket of the rear wheel and to the chainwheel of the intermediate hub;
wherein the first chain segment and the second chain segment are configured to convert pivoting movements of the first and second lever arms to rotational movements of the first and second freewheels;
wherein the first freewheel, the second freewheel and the chainwheel are configured such that rotational movements of the first freewheel and the second freewheel are converted to rotational movement of the chainwheel;
wherein the chain is configured to convert rotation of the chainwheel of the intermediate hub to rotary motion of the sprocket of the rear wheel for propelling the rear wheel of the bicycle;
wherein each of the two rear-facing levers is operably coupled to a respective segment of the second chain at an attachment point that defines an attachment axis;
wherein each of the two rear-facing lever arms are configured to pivot in an oscillatory manner between an upper extreme pedal position and a lower extreme pedal position;

wherein, in the upper extreme pedal position, the attachment axis defined by the attachment point of the respective lever arm to the corresponding segment of the second chain is positioned both rearward and above the second axis; and
wherein, in the lower extreme pedal position, the attachment axis defined by the attachment point of the respective lever arm to the corresponding segment of the second chain is positioned below the second axis.

6. A bicycle according to claim 5, wherein:
in the upper extreme pedal position, a straight line guided from the second axis through the attachment axis defined by the attachment point of the respective lever to the corresponding segment of the second chain is tangent to the corresponding freewheel that rotates about the third axis.

7. A bicycle according to claim 6, wherein:
in the upper extreme pedal position, the attachment axis defined by the attachment point of the respective lever to the corresponding segment of the second chain is located on the straight line that is tangent to the corresponding freewheel and the attachment axis defined by the attachment point of the respective lever to the corresponding segment of the second chain is disposed between the second axis and an axis of the corresponding pedal.

8. A bicycle according to claim 5, further comprising:
a wheel supported on the frame and operably coupled to both the first and second chain segments.

9. A bicycle according to claim 8, wherein:
the wheel is disposed below the third axis.

10. A bicycle according to claim 8, wherein:
the wheel lies in a plane tangent to the first and second freewheels.

11. A bicycle according to claim 8, wherein:
the first and second chain segments are joined together by a third chain segment that is guided by the wheel.

12. A bicycle according to claim 11, wherein:
the third chain segment and the wheel are configured such that a driving stroke of one pedal causes a return stroke of the other pedal.

13. A bicycle according to claim 5, wherein:
in the lower extreme pedal position, a straight line guided from the second axis through the axis of the respective pedal assumes a vertical orientation.

14. A bicycle comprising a frame, a rear wheel supported by the frame and configured to rotate about a first axis, first and second rear-facing lever arms supported by the frame and configured to pivot about a second axis spaced forward with respect to the first axis of the rear wheel, pedals extending from the first and second lever arms, and first and second freewheels supported by the frame and linked to the first and second lever arms by corresponding first and second chain segments, wherein rotation of the first and second freewheels is driven by pivoting movement of the first and second levers that is transmitted to the first and second freewheels via the corresponding first and second chain segments, and wherein rotation of the first and second freewheels drives rotation of the rear wheel of the bicycle, characterized in that
an intermediate hub is supported by the frame in a position along a third axis, wherein the third axis is spaced forward with respect to the first axis of the rear wheel and spaced rearward with respect to the second axis, wherein the first freewheel, the second freewheel and a chainwheel are all fixed to the intermediate hub and rotate about the third axis;
a sprocket is mounted on the rear wheel of the bicycle; and a chain, separate from the first and second chain segments, interfaces to both the sprocket of the rear wheel and to the chainwheel of the intermediate hub;

wherein the first chain segment and the second chain segment are configured to convert pivoting movements of the first and second lever arms to rotational movements of the first and second freewheels;

wherein the first freewheel, the second freewheel and the chainwheel are configured such that rotational movements of the first freewheel and the second freewheel are converted to rotational movement of the chainwheel; and wherein the chain is configured to convert rotation of the chainwheel of the intermediate hub to rotary motion of the sprocket of the rear wheel for propelling the rear wheel of the bicycle;

wherein each of the two rear-facing levers is operably coupled to a respective segment of the second chain at a corresponding attachment point that defines an attachment axis;

wherein the rear-facing levers are each configured to pivot in an oscillatory manner between an upper extreme pedal position and a lower extreme pedal position;

wherein in the upper extreme position, a straight line guided from the second axis through the attachment axis defined by the attachment point of the respective lever to the corresponding segment of the second chain is tangent to the corresponding freewheel that rotates about the third axis;

wherein, in the upper extreme pedal position, the attachment axis defined by the attachment point of the respective lever arm to the corresponding segment of the second chain is positioned both rearward and above the second axis; and wherein, in the lower extreme pedal position, the attachment axis defined by the attachment point of the respective lever arm to the corresponding segment of the second chain is positioned below the second axis.

15. A bicycle according to claim 14, wherein:

in the upper extreme pedal position, the attachment axis defined by the attachment point of the respective lever to the corresponding segment of the second chain is located on the straight line that is tangent to the corresponding freewheel and the attachment axis defined by the attachment point of the respective lever to the corresponding segment of the second chain is disposed between the second axis and an axis of the corresponding pedal.

16. A bicycle according to claim 14, wherein:

in the lower extreme pedal position, a straight line guided from the second axis through the axis of the respective pedal assumes a vertical orientation.

* * * * *